(12) United States Patent
Wilke et al.

(10) Patent No.: US 12,398,804 B2
(45) Date of Patent: Aug. 26, 2025

(54) SLOTTED GUIDE RING WITH RECIRCULATING LUBRICATION AND PISTON-CYLINDER UNIT

(71) Applicant: Trelleborg Sealing Solutions Germany GmbH, Stuttgart (DE)

(72) Inventors: Mandy Wilke, Boeblingen (DE); Holger Jordan, Neuhausen a.d.F. (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 0 days.

(21) Appl. No.: 18/665,474

(22) Filed: May 15, 2024

(65) Prior Publication Data

US 2024/0288072 A1   Aug. 29, 2024

Related U.S. Application Data

(63) Continuation of application No. PCT/EP2022/082023, filed on Nov. 15, 2022.

(30) Foreign Application Priority Data

Nov. 18, 2021 (DE) .............. DE 10 2021 213 007.0

(51) Int. Cl.
*F16J 1/02* (2006.01)
*F16J 1/08* (2006.01)

(52) U.S. Cl.
CPC .. *F16J 1/02* (2013.01); *F16J 1/08* (2013.01)

(58) Field of Classification Search
CPC ...... F16J 15/3208; F16J 1/02; F15B 15/1461; F15B 15/1452
See application file for complete search history.

(56) References Cited

U.S. PATENT DOCUMENTS

| 2,489,715 A | 11/1949 | Mark et al. |
| 4,334,688 A | 6/1982 | Spargo et al. |
| 4,928,577 A * | 5/1990 | Stoll .............. F16J 15/56 |
| | | 277/436 |
| 6,685,194 B2 * | 2/2004 | Dietle ............ F16J 15/3244 |
| | | 277/560 |

(Continued)

FOREIGN PATENT DOCUMENTS

| AT | 387 440 B | 1/1989 |
| CN | 1664390 A | 9/2005 |
| CN | 207376231 U | 5/2018 |

(Continued)

*Primary Examiner* — Abiy Teka (74) *Attorney, Agent, or Firm* — Orbit IP, LLP; Marc G. Martino (57) ABSTRACT

A slotted guide ring for a piston-cylinder unit has a first free end portion and a second free end portion, which are arranged at a distance from one another in the circumferential direction of the guide ring, forming an axial through gap, and the end faces of which are arranged parallel to one another or substantially parallel to one another. In their projection on the central axis Z, the end faces enclose an acute angle $\alpha$ with the central axis Z of $15° \leq \alpha \leq 75°$. On the guide side, a lubricant channel is formed which extends from the first free end portion to the second free end portion and which is open on both sides towards the axial through gap. The invention further relates to a piston-cylinder unit with such a guide ring.

9 Claims, 5 Drawing Sheets

(56) References Cited

U.S. PATENT DOCUMENTS

| | | | |
|---|---|---|---|
| 2004/0042695 | A1 | 3/2004 | Kiyoyuki |
| 2014/0219588 | A1* | 8/2014 | McCulfor ............... F16C 29/02 384/129 |

FOREIGN PATENT DOCUMENTS

| | | | |
|---|---|---|---|
| CN | 208004167 U | 10/2018 | |
| CN | 113339403 A | 9/2021 | |
| DE | 2 235 987 A | 1/1974 | |
| DE | 2 348 739 A1 | 6/1974 | |
| DE | 75 35 535 U | 4/1977 | |
| DE | 34 42 463 A1 | 5/1986 | |
| DE | 37 31 158 A1 | 3/1989 | |
| DE | 299 395 A7 | 4/1992 | |
| DE | 40 35 824 A1 | 5/1992 | |
| DE | 20 2008 012 376 U1 | 1/2009 | |
| DE | 10 2011 009 326 A1 | 7/2012 | |
| GB | 918 013 A | 2/1963 | |
| GB | 1396230 A | 6/1975 | |
| JP | S58-84240 A | 5/1983 | |
| JP | H07-182771 A | 7/1995 | |
| JP | H10-89473 A | 4/1998 | |
| JP | 2002-267016 A | 9/2002 | |
| KR | 10-2007-0035756 A | 4/2007 | |

* cited by examiner

SLOTTED GUIDE RING WITH RECIRCULATING LUBRICATION AND PISTON-CYLINDER UNIT

CROSS-REFERENCE TO RELATED APPLICATIONS

This continuation application claims priority to PCT/EP2022/082023 filed on Nov. 15, 2022, which has published as WO 2023/088913 A1, and also the German application number DE 10 2021 213 007.0 filed on Nov. 18, 2021, the entire contents of which are fully incorporated herein with these references.

DESCRIPTION

Field of the Invention

The present invention generally relates to piston-cylinder units. More particularly, the present invention relates to a slotted guide ring for a piston-cylinder unit.

Background of the Invention

In the case of piston-cylinder units, the piston (or the piston rod) is usually guided via one or more guide rings on the cylinder. The guide rings prevent metallic contact between the two components and absorb and balance radial forces. The latter is also substantial for the reliable sealing performance and longevity of sealing elements used between the moving components. The guide rings are usually slotted in order to allow for simplified assembly of the guide rings.

The slotted guide rings used in practice are available in a variety of materials in order to ensure the best possible wear resistance of the guide rings for the specific application. By selecting their base material accordingly, the guide rings can be designed for different operating times and for different radial forces to be absorbed during operation. Specially modified thermoplastic materials such as polytetrafluoroethylene (PTFE), polyamides (PA), or polyoxymethylene (POM) are often used for this purpose. Other aspects that the guide rings must satisfy are the lowest possible coefficient of friction in the pairing with the material of the machine part that is in dynamic contact with the guide ring, anti-adhesive behavior, a suitable operating temperature range, if necessary chemical resistance, as well as the highest possible resistance to aging.

In the case of the guide rings available on the market, malfunctions such as increased wear or a pronounced slip-stick effect or, in extreme cases, even failure of the guide ring can occur due to manufacturing tolerances of the guide rings themselves, but also of the machine parts that move relative to one another. In this respect, adequate lubrication of the guide ring in the region of its contact zone(s) with the machine part that dynamically rests against the guide ring is of decisive importance.

DE 20 2008 012 376 U1 discloses a profiled guide band for piston-cylinder units, which is arranged in a ring shape during operation. The guide band has a guide side with a plurality of lubricant channels running parallel to one another, which are arranged so as to run diagonally with respect to the side flanks of the guide band or the guide ring formed therefrom. To this extent, the lubricant channels extend partially in the axial direction from one side flank to the other and have a considerable difference in length. In the case of this guide band/ring, pronounced temperature gradients in the material of the guide ring and associated changes in shape can occur during operation, not least because of the different lengths of the lubricant channels. In addition, there is a risk of individual lubricant channels becoming clogged due to impurities contained in the lubricant, which impurities can cause local lubrication problems and undesirable stick-slip effects and increase undesirable changes in shape of the guide ring.

DE 37 31 158 A1 discloses a slotted guide ring for a piston-cylinder unit, comprising at least one lubricant channel on its guide side, which extends in the circumferential direction of the guide ring from the first free end portion to the second free end portion of the guide ring and which is open on both sides toward the axial passage gap between both end portions of the guide ring.

SUMMARY OF THE INVENTION

The object of the invention is to specify a guide ring for a piston-cylinder unit and a piston-cylinder unit having at least one such guide ring, in which the aforementioned manufacturing tolerances have a smaller impact and in which further improved lubrication and cooling of the aforementioned contact zones of the guide ring can be achieved.

The object relating to the guide ring is achieved by a guide ring having the features specified in the independent claim. Preferred embodiments of the invention are specified in the dependent claims and in the description.

The guide ring according to the invention is intended for use in a piston-cylinder unit and consists partially or completely of a viscoplastically deformable base material. The guide ring comprises a guide side, which points inward or outward in a direction radial to the central axis of the guide ring, and which is used for dynamically contacting and guiding on a machine part, in particular, on the cylinder of the piston-cylinder unit. The guide ring further comprises a rear side which points away from the guide side in the radial direction and which serves to support the guide ring in static contact on another machine part, in particular, the piston (or a piston rod) of the piston-cylinder unit. It should be noted that the term "piston" is also to be understood as meaning a piston rod that is known per se. A first and a second free end portion of the guide ring are arranged at a distance from one another in the circumferential direction of the guide ring, forming an axial passage gap. The end faces of the free end portions are arranged parallel to one another or running substantially parallel, with the two end faces enclosing an acute angle $\alpha$ of $15° \leq \alpha \leq 75°$, in particular, $25° \leq \alpha \leq 60°$, with the central axis in their projection onto the central axis.

In addition, a plurality of annular beads is formed on the guide side, which are each arranged at a distance from one another in an axial direction relative to the central axis Z of the guide ring. A lubricant channel is formed in each case between two immediately adjacent annular beads. Each lubricant channel is therefore delimited on both sides in the axial direction by one of the annular beads. In particular, the guide ring can have exactly one, two, or exactly three lubricant channels. The guide ring can also have more than three lubricant channels. According to the invention, each lubricant channel extends in the circumferential direction of the guide ring from the first free end portion to the second free end portion and is open on both sides toward the passage gap of the guide ring. In other words, each lubricant channel of the guide ring opens into the aforementioned axial passage gap.

Due to its annular beads, the guide ring offers a plurality of linear or ring-shaped load bearing surfaces or contact zones for the machine part of the piston-cylinder unit guided thereon when installed. Due to the linear contact zones of the guide ring, which are at a distance from one another, a particularly low-friction guidance of the two machine parts can be achieved relative to one another. In addition, thereby, and by means of the viscoplastic material of the guide ring, undesirable stick-slip behavior can be counteracted.

During operation, each lubricant channel of the guide ring can improve the lubricating behavior of the dynamic contact zones formed by the annular beads over the entire or substantially the entire circumferential extent of the guide ring for the machine part, which is guided in a form-fitting connection with sliding clearance in contact with the guide ring, and thus improve the service life of the guide ring. The result of the at least one lubricant channel, or each lubricant channel, being designed to be open at both ends only toward the end faces of the two free end portions is, from a thermal point of view during operation, particularly uniform cooling and lubrication of the guide ring in the region of the contact zones of the annular beads on the sliding surface of the machine part in dynamic contact with the guide ring. In addition, the production of the guide ring is simplified.

The viscoplastic deformability of the guide ring allows, when the latter is installed, dynamic adjustment of the size of the corresponding (ring-shaped) load-bearing surface/contact zone according to a radial force acting on the guide ring. The size of the corresponding contact zone of the guide ring thus increases with an increased radial force acting locally on the guide ring and vice versa. Compared to conventional guide rings, in which the size of the contact zone is invariant and therefore substantially independent of the corresponding radially directed load acting on the guide ring, this results in an overall flattened progression of the contact pressure (surface pressure in $N/mm^2$) between the sliding surface of the machine part sliding dynamically along the sliding surface of the guide ring and the guide ring with increasing radial load of the guide ring. The design of the guide ring according to the invention can thus compensate for unavoidable manufacturing tolerances of the guide ring itself and of the machine parts of the piston-cylinder unit that are to be supported on one another via the guide ring. In addition, the guide ring can withstand greater radial loads than conventional guide rings made of the same base material. According to the invention, each lubricant channel has a wavy course in the circumferential direction. With this design, a particularly effective cooling of the guide ring and flushing of each lubricant channel can be achieved.

According to the invention, the free end portions preferably each have a flow funnel for the lubricant, into which each of the lubricant channels of the guide ring opens. Each of these flow funnels widens toward the axial passage gap. As a result, on the one hand, a particularly large inflow opening can be provided for the lubricant channels. On the other hand, a sufficiently large back pressure of the lubricant flowing into the flow funnel can be built up in the region of the corresponding flow funnel. This ensures that the lubricant during operation-derived from the relative movement of the two machine parts (piston/cylinder)-is pressed into each lubricant channel at a sufficiently high flow rate for flushing, lubrication, and cooling purposes of the dynamic contact zones formed by the annular beads. In this way, impurities contained in the lubricant channel can be reliably removed or flushed out of the lubricant channel during operation.

According to the invention, each lubricant channel can have a wavy course in the circumferential direction. With this design, a particularly effective cooling of the guide ring and flushing of each lubricant channel can be achieved.

Each lubricant channel can have a static constriction or a dynamic constriction of its flow cross section at at least one circumferential position of the guide ring. A static constriction is present when it has a flow cross section that does not change during operation of the guide ring. On the other hand, in the region of a dynamic constriction, the lubricant channel exhibits a function of the lubricant pressure or volume flow within the lubricant channel on a variable flow-through cross section. This can be implemented, for example, by an inflow element that is inherently flexibly deformable or is flexibly articulated on the guide ring (through which the lubricant can flow). The inflow element can be designed, for example, in the form of an elastically deformable tongue, which is designed in one piece with the rest of the guide ring and which protrudes into the lubricant channel. The tongue can preferably be bidirectionally deflected/deformed in the circumferential direction of the guide ring. Alternatively, the inflow element can also be a ball or the like, which protrudes into the lubricant channel and which can be moved (at least partially) out of the lubricant channel in an axial or radial direction against the force of a spring element or the material of the guide ring.

Due to its annular beads arranged on the guide side, the guide ring offers, when installed, a plurality of linear or ring-shaped load bearing surfaces or contact zones for the machine part of the piston-cylinder unit guided thereon. Due to the linear load-bearing surfaces of the guide ring being arranged at a distance from one another, a particularly low-friction guidance of the two machine parts can be achieved relative to one another. In addition, thereby, and by means of the viscoplastic material of the guide ring, undesirable stick-slip behavior can be counteracted.

According to the invention, each of the annular beads preferably has an apex having side flanks which fall away on both sides of the apex in a radial direction, relative to the central axis of the guide ring.

According to a preferred embodiment of the invention, in the unloaded cross section of the guide ring, the annular beads of the guide ring are designed to be convexly curved outward in the radial direction. As a result, the guide ring can also absorb large and very large bearing forces. The radial projections can, in particular, (in the unloaded cross section of the guide ring) have a curvature which is at least partially or substantially a circular line.

The rear side of the guide ring can be designed cylindrical in the unloaded cross section of the guide ring. As a result, the guide ring can be supported over its entire surface on a cylindrically shaped groove base of a retaining groove of a machine part.

According to an alternative embodiment, the cross section of the rear side of the unloaded guide ring or of the installed guide ring can be designed wave-shaped or zigzag-shaped, i.e., it can have a plurality of radial projections. These radial projections preferably extend in a manner corresponding to the annular beads in the circumferential direction of the guide ring over the entire or substantially over the entire circumferential extent of the guide ring.

It should be noted that the annular beads and the radial projections can be arranged in alignment with one another in the radial direction in the cross section of the guide ring. As a result, the response behavior of the guide ring to changing radial loads on the guide ring can be adjusted in a simple manner by the geometric design of the radial projections. In addition, one and the same guide ring can be used as a so-called rod or piston rod guide ring, or as a piston ring. In the former case, the guide ring is arranged in the retaining groove of the cylinder or housing of the (piston) rod and, in the latter case, the guide ring is arranged in the retaining groove of the piston. This improves the range of use of the guide ring and reduces provision and storage costs. The annular beads and the radial projections are preferably designed identically in terms of size and geometry.

The guide ring particularly preferably has a crowned flank portion on both sides in the axial direction. As a result, when the guide ring is installed in a retaining groove or the like, deformation of the guide ring in the axial direction can be promoted. Undesirable tilting of the guide ring during its assembly can also be counteracted in a simple manner as a result.

According to the invention, the base material of the guide ring can, in particular, be a duroplastic, or else a thermoplastic. In particular, specially modified thermoplastic materials such as polytetrafluoroethylene (PTFE), polyamides (PA), or polyoxymethylene (POM) can be used.

According to the invention, the guide ring can have a multi-component design. In particular, the guide ring can have a support or reinforcement insert that is known per se, preferably made of metal or a technical ceramic. This is advantageous for the range of use of the guide ring.

According to the invention, the annular beads can comprise a harder material with a preferably lower coefficient of friction than the base material of the guide ring or the rest of the guide ring.

The piston-cylinder unit according to the invention comprises a first machine part in the form of a piston or a piston rod and a second machine part in the form of a cylinder, within which the first machine part is guided so that it can be moved back and forth along a movement axis. At least one guide ring according to the above embodiments is arranged in a retaining groove of one of the two machine parts. The piston is supported and guided, in a form-fitting connection with sliding clearance, on the cylinder via this guide ring, with the formation of a bearing gap formed between the piston and the cylinder. This is done in such a way that, during a forward stroke movement of the first machine part, a lubricant arranged in the bearing gap flows via one of the two free end portions of the guide ring and, during a return stroke movement of the first machine part, via the corresponding other of the two free end portions of the guide ring, into the at least one lubricant channel of the guide ring. Derived from the axial relative movement of the two machine parts, the lubricant is thus introduced into the at least one lubricant channel of the guide ring and guided therethrough in a flowing manner.

The piston-cylinder unit can be used for pneumatic or hydraulic applications.

If the at least one lubricant channel has a dynamic narrowing, media-actuated deactivation of the dynamic constriction of the flow cross section of the at least one lubricant channel is effected when a defined back pressure of the lubricant within the at least one flow channel is reached or exceeded. Due to the constriction, a turbulent flow can be achieved within the lubricant channel, through which a particularly efficient mixing of the lubricant and an improved discharge of impurities introduced into the lubricant channel is possible.

With respect to the movement axis, the guide ring is preferably arranged with an axial gap in the retaining groove. As a result, simplified assembly and operation of the piston-cylinder unit that is less susceptible to faults can be ensured.

Further advantages of the invention can be found in the description and the drawings. The embodiments shown and described are not to be understood as an exhaustive enumeration, but rather have exemplary character for the description of the invention.

BRIEF DESCRIPTION OF THE DRAWINGS

In the drawings:

FIG. 2 shows the guide ring according to FIG. 1 in an isolated perspective detailed view (FIG. 2A) and in cross section (FIG. 2B);

DETAILED DESCRIPTION OF EMBODIMENTS OF THE INVENTION

Figure 1:
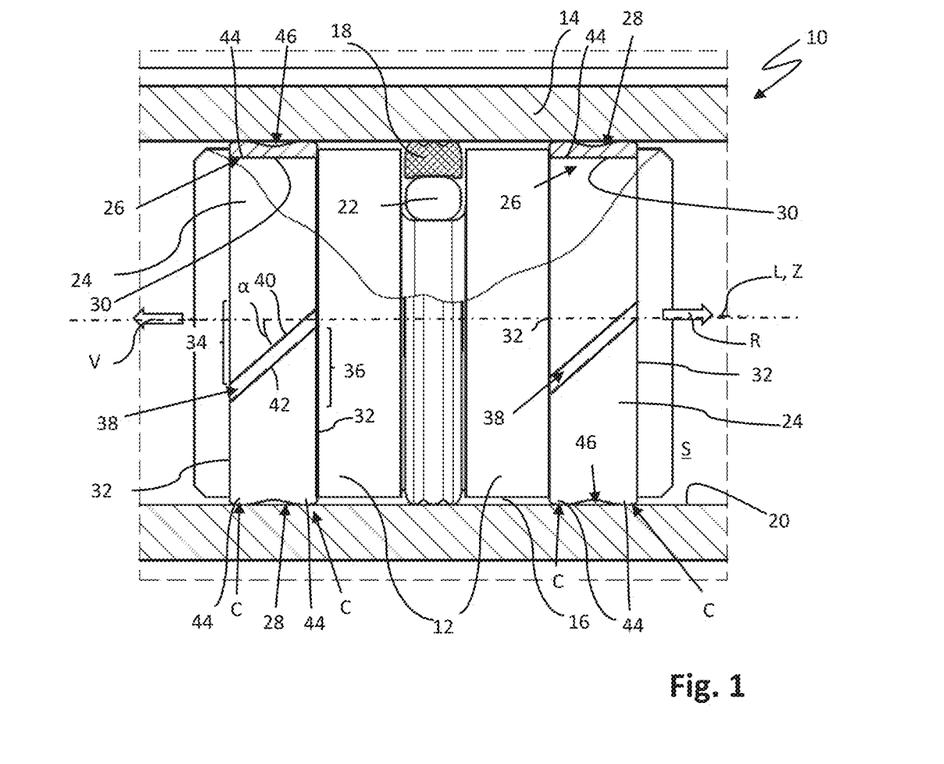
FIG. 1 shows a piston-cylinder unit according to the invention having a guide ring in a partial sectional view.

FIG. 1 shows a partial sectional view of a piston-cylinder unit 10. The piston-cylinder unit 10 comprises a first machine part 12 in the form of a piston and a second machine part 14 in the form of a cylinder. The piston 12 is guided within the cylinder 14 so that it can be moved back and forth along a movement axis L. It should be noted that the term "piston" is also to be understood as meaning a piston rod that is known per se.

A sealing ring 18 is used in this case to seal a bearing gap 16 formed between the piston and the cylinder in a fluid- or pressure-tight manner. The sealing ring 18 is in dynamic sealing contact with a sliding surface 20 of the cylinder formed by the inner wall of the cylinder. The sealing ring 18 can be provided with a prestressing element 22. The first machine part 12 is provided in this case with two guide rings 24, via which the first machine part 12 is guided on the sliding surface 20 of the second machine part 14.

The two guide rings 24 shown in FIG. 1 are each arranged in a circumferential retaining groove 26 of the first machine part 12. Each guide ring 24 has a dynamically guiding front or guide side 28 and a rear side 30 which are connected to one another via side flanks 32 of the guide ring 24. The guide side 28 is used for dynamically contacting the corresponding guide ring 24 on the cylinder 14. Accordingly, the guide side 28 points outward in a direction radial to the central axis Z of the guide ring 24 in this case. The central axis Z of the guide ring 24 coincides or substantially coincides with the movement axis L of the piston-cylinder unit 10 in the assembled state of the guide ring 24 (see, for example, FIG. 1). The contact zones of each guide ring 24 with the sliding surface 20 are denoted by C.

The rear side 30 of the corresponding guide ring 24 is used for statically contacting support of the guide ring 28 on the groove base of the machine part 12, 14 having the retaining groove 26, in this case for example the piston 12 shown in FIG. 1.

Figure 2A:
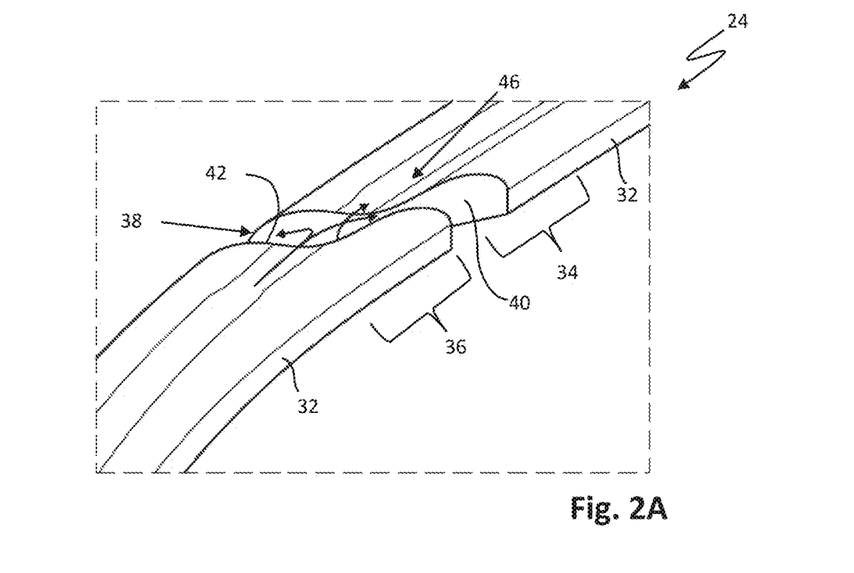
Figure 2B:
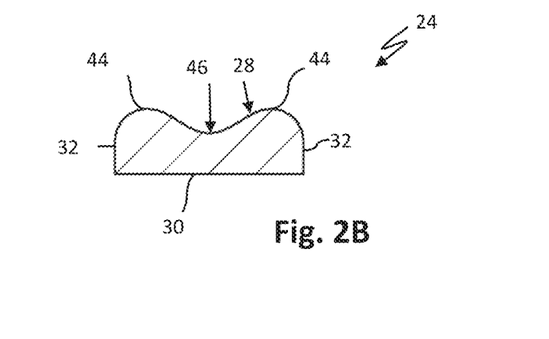

In FIG. 2, the guide ring 24 is shown in a cut-out perspective detail. The guide ring 24 is designed to be slotted. Accordingly, the guide ring 24 has a first and a second end portion 34, 36 in the circumferential direction, which are arranged at a distance from one another to form an axial passage gap 38. The slotted shape of the guide ring 24 simplifies its assembly. The two end portions 34, 36 have end faces 40, 42 facing one another, which are arranged parallel to one another or substantially running parallel to one another. In their projection onto the central axis Z, the end faces 40, 42 each enclose an acute angle $\alpha$ of $15°\leq\alpha\leq75°$ with the central axis Z (cf. FIG. 1). According to FIG. 1, the angle $\alpha$ can, in particular, be 40°.

When the piston-cylinder unit 10 is in operation, each guide ring 24 sometimes has to absorb high radial loads and is inevitably subject to wear, not least because of mechanical and thermal loads caused by friction. Due to manufacturing tolerances of conventional guide rings themselves, but also of the machine parts that move relative to one another, malfunctions such as increased wear, an undesirable slip-stick effect or, in extreme cases, even premature failure of the conventional guide rings can occur. Each guide ring 24 therefore has a plurality of annular beads 44 formed on/on top of its guide side 28, which are each arranged at a distance from one another in an axial direction relative to the central axis Z of the guide ring 24. A lubricant channel 46 is delimited on both sides in the axial direction by the annular beads 44. The lubricant channel 46 extends in the circumferential direction of the guide ring 24 from the first free end portion 34 to the second free end portion 36 and is open on both sides toward the axial passage gap 38. The lubricant channel 46 is therefore fluidically connected at both ends to the axial passage gap 38.

During a forward stroke movement V of the first machine part 12 and during a return stroke movement R of the first machine part 12, a lubricant S arranged in the bearing or sealing gap 16 is dragged or pressed into the lubricant channel 46 alternately via that free end portion 34, 36 of the guide ring 24, the end face 40, 42 of which points in the respective direction of movement of the first machine part 12 in the axial direction.

During operation of the piston-cylinder unit 10, a targeted flow of the lubricant S through the lubricant channel 46 can be ensured in this way and the lubrication and cooling of the contact zone C of the guide ring 24 on the sliding surface 20 of the second machine part 14 can thus be improved. Overall, this can reliably counteract premature wear of the guide ring 24 and undesirable stick-slip.

Figure 3:
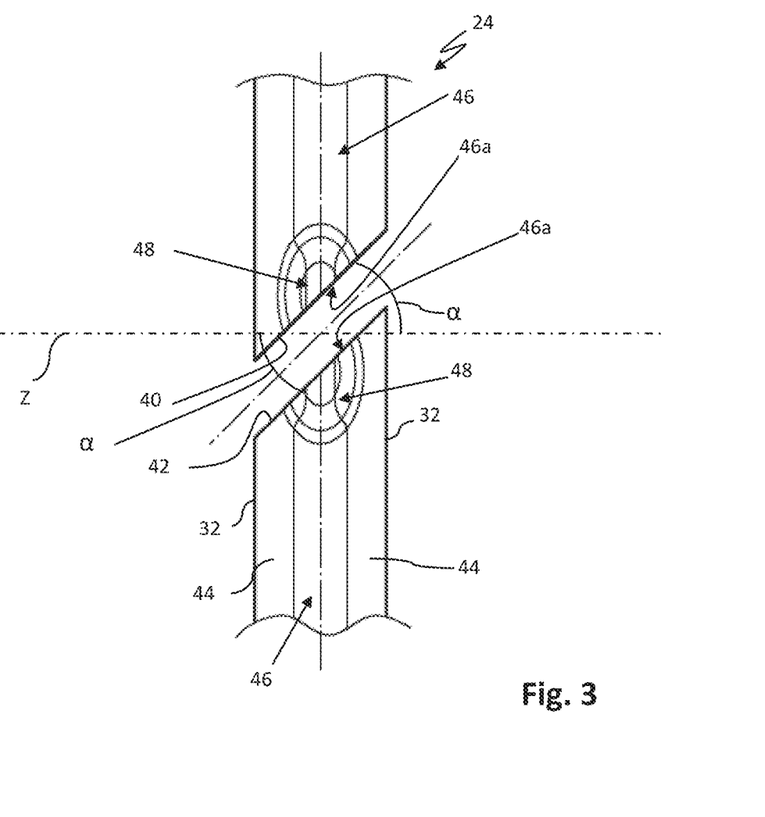
FIG. 3 shows a further guide ring having one lubricant channel and having flow funnels formed on the end portion side, into which the lubricant channel opens at both ends, in a detailed section.

According to FIG. 3, each lubricant channel 46 of the guide ring 24 can widen toward the end face 40, 42 of the corresponding end portion 34, 36 and thus form a flow funnel 48 or open into a flow funnel 48 of the end portions 34, 36. As a result, on the one hand, a particularly large inflow opening 46a can be provided for each of the lubricant channels 46. On the other hand, during a forward stroke movement V and also during a return stroke movement R of the piston (FIG. 1), a back pressure of the lubricant flowing into the corresponding flow funnel 48 can be built up. This ensures that the lubricant S during operation—derived from the relative movement of the two machine parts 12, 14—is pressed into each lubricant channel 46 at a sufficiently high flow rate for flushing, lubrication, and cooling purposes. Particulate impurities contained in the lubricant S (not shown in the drawing) that enter the at least one lubricant channel 46 of the guide ring 24 can be reliably removed or flushed out of the lubricant channel 46 during operation.

Figure 4:
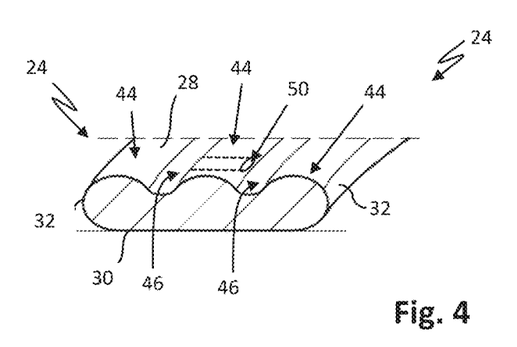
FIG. 4 shows another guide ring having two lubricant channels arranged strictly in the circumferential direction of the guide ring, in a partial cross section.

According to FIG. 4, the guide ring can also have more than two, in particular, three, annular beads 44 on its guide side 28. Two pairs of annular beads 44 delimit a lubricant channel 46 between one another. The two lubricant channels 46 preferably jointly form or open into one of the flow funnels explained in connection with FIG. 3 on each of the two end portions 34, 36 of the guide ring 24. It should be noted that the lubricant channels 46 may be fluidically connected to one another by one or more axial connection passages 50.

Figure 5:
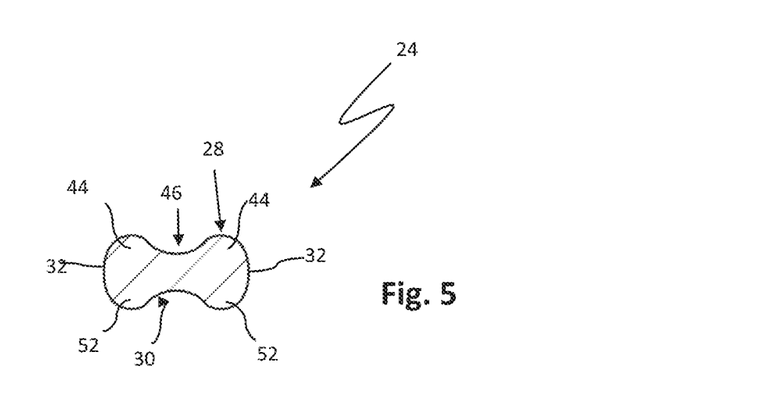
FIG. 5 shows another guide ring having rear radial projections in a partial cross section.

According to the sectional illustration shown in FIG. 5, the guide ring 24 can also have a rear side 30 which is corrugated in the axial direction and has radial projections 52. With this design, manufacturing tolerances both of the two machine parts and of the guide ring 24 can be compensated for particularly effectively. The rear radial projections 52 of the guide ring 24 can be arranged in alignment in the radial direction with the annular beads 44 on the front side of the guide ring. It is also possible to match the annular beads 44 in their geometry and size.

Figure 6:
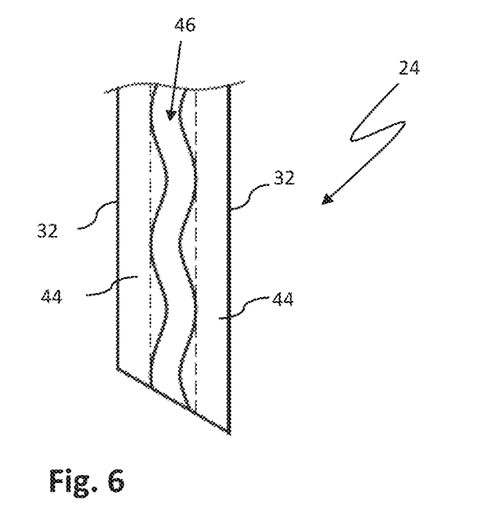
FIG. 6 shows a guide ring having a lubricant channel that has a constant flow cross section and extends in the circumferential direction in a wavy course.

According to the embodiment of the guide ring 24 shown in FIG. 6, the lubricant channel 46 can, in particular, have a uniform, wavy course in the circumferential direction. This design shows a particularly efficient lubrication of the contact zone C of the annular beads 44 with the associated sliding surface 20 of the cylinder 12.

Figure 7:
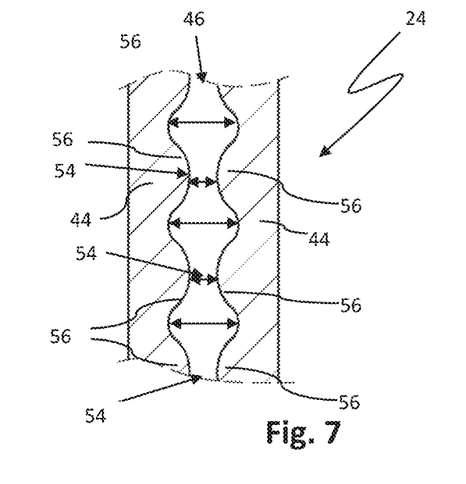
FIG. 7 shows a guide ring having an inconstant flow cross-sectional course in the circumferential direction.
Figure 8:
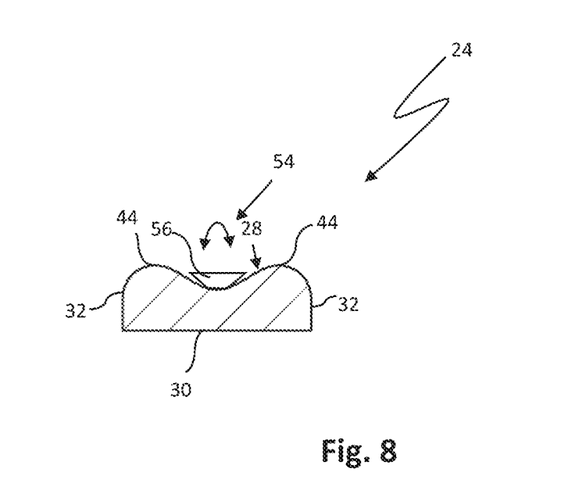
FIG. 8 shows a guide ring having an inflow element protruding into the lubricant channel, which causes a variable constriction of the lubricant channel depending on the lubricant flow, wherein the inflow element is bidirectionally and flexibly deflectable from a neutral position shown in the circumferential direction of the guide ring.

According to FIG. 7, each lubricant channel 46 of the guide ring 24 can have one or more statically and/or dynamically variable constrictions 54 (of its free cross section, through which the lubricant can flow). Each constriction 54 can, in particular, be provided by an inflow element 56, for example be in the form of a wall projection or wall projections as shown in FIG. 7. In the case of a dynamically variable constriction 54, the inflow element 56 can, for example, be flexibly deformable or flexibly deflectable on the guide ring. As a result, the inflow element 56 can—actuated by a lubricant—be deflected in the direction of the central axis Z of the guide ring 24. Such constrictions 54 can generate a back pressure of the lubricant within the lubricant channel 46, so the lubrication can be set locally according to need.

The annular beads 44 and/or the rear radial projections 52 of the guide ring 24 can have a material that has a smaller modulus of elasticity or a smaller coefficient of friction compared to the material of the rest of the guide ring 24.

The guide ring 24 can consist at least partially or entirely of an elastomer, such as an ethylene propylene diene monomer rubber (=EPDM) or a fluorine rubber (=FKM), as well as additives familiar to a person skilled in the art. PA (polyamide) or high-temperature-resistant thermoplastics such as PEEK (=polyetheretherketone) are also suitable. It goes without saying that the guide ring 24 can have a reinforcement or support insert known per se, for example in the form of a support ring. The reinforcement or support insert can, in particular, be made of metal, a technical ceramic, or a carbon-fiber-containing composite material. The guide ring can also be preassembled in a cartridge and can be inserted together with this cartridge into a retaining groove of the piston or cylinder.

What is claimed is:

1. A slotted guide ring for a piston-cylinder unit, which consists partially or completely of a viscoplastically deformable base material, comprising:
- a guide side which points inward or outward in a direction radial to the central axis Z of the guide ring and which is used for dynamically contacting abutment on a machine part; and
- a rear side which points away from the guide side in the radial direction and which serves to support the guide ring in a statically contacting manner;
- a first free end portion and a second free end portion, which are at a distance from one another in the circumferential direction of the guide ring, forming an axial passage gap, and an end faces of which extend parallel to one another, the end faces enclosing an acute angle α of $15° \leq \alpha \leq 75°$ with the central axis Z in their projection onto the central axis Z;
- a plurality of annular beads formed on the guide side, which are each arranged at a distance from one another in an axial direction relative to the central axis Z of the guide ring; and
- at least one lubricant channel which is delimited on both sides in the axial direction by two of the annular beads, the at least one lubricant channel extending in the circumferential direction of the guide ring from the first free end portion to the second free end portion and being open on both sides toward the axial passage gap;
- wherein the at least one lubricant channel has a wavy course in the circumferential direction.

2. The guide ring according to claim 1, wherein the two free end portions each have a flow funnel into which each of the lubricant channels opens.

3. The guide ring according to claim 1, wherein the at least one lubricant channel has a static or dynamic constriction in at least one circumferential position of the guide ring.

4. The guide ring according to claim 1, wherein the rear side is designed to be wave-shaped or zigzag-shaped in cross section of the unloaded guide ring and has a plurality of radial projections which each extend in the circumferential direction of the guide ring over the entire circumferential extent of the guide ring.

5. The guide ring according to claim 4, wherein the annular beads and the radial projections are arranged in alignment with one another in a radial direction.

6. The guide ring according to claim 1, wherein the annular beads comprise a harder material with a preferably lower coefficient of friction than the base material of the guide ring.

7. A piston-cylinder unit, comprising:
- a first machine part in the form of a piston rod or piston;
- a second machine part in the form of a cylinder, in which the first machine part is guided wherein it is configured to be moved back and forth along a movement axis;
- at least one slotted guide ring according to claim 1, which is arranged in a retaining groove of one of the two machine parts, and via which the corresponding other machine part is supported and guided, in a form-fitting connection with sliding clearance, by the formation of a bearing gap formed between the two machine parts, wherein, during a forward stroke movement V of the first machine part, a lubricant S arranged in the bearing gap flows via one of the free end portions of the guide ring and, during a return stroke movement of the first machine part, via the corresponding other of the two end portions of the guide ring into the at least one lubricant channel of the guide ring.

8. The piston-cylinder unit according to claim 7, wherein the at least one lubricant channel has a static or dynamic constriction in at least one circumferential position of the guide ring, and wherein the dynamic constriction of the lubricant channel is configured to be reduced or deactivated during operation by the lubricant flowing through the lubricant channel.

9. The piston-cylinder unit according to claim 7, wherein the guide ring is arranged with axial clearance in the retaining groove with respect to the movement axis.

* * * * *